(12) United States Patent
Vicci et al.

(10) Patent No.: US 6,960,984 B1
(45) Date of Patent: Nov. 1, 2005

(54) METHODS AND SYSTEMS FOR REACTIVELY COMPENSATING MAGNETIC CURRENT LOOPS

(75) Inventors: Leandra Vicci, Siler City, NC (US); Wayne D. Dettloff, Cary, NC (US)

(73) Assignees: University of North Carolina, Chapel Hill, NC (US); dBTag, Inc., Research Triangle Park, NC (US)

(*) Notice: Subject to any disclaimer, the term of this patent is extended or adjusted under 35 U.S.C. 154(b) by 909 days.

(21) Appl. No.: 09/723,356

(22) Filed: Nov. 27, 2000

Related U.S. Application Data (60) Provisional application No. 60/169,726, filed on Dec. 8, 1999.

(51) Int. Cl.[7] .......... H04Q 5/22; H01Q 11/02; H01Q 7/00; H01Q 21/00
(52) U.S. Cl. .......... 340/10.1; 343/742; 343/744; 343/866; 343/867
(58) Field of Search .......... 343/742, 842, 343/866, 867, 744; 340/10.1

(56) References Cited

U.S. PATENT DOCUMENTS

| | | | | |
|---|---|---|---|---|
| 2,166,750 A | * | 7/1939 | Carter | 343/742 |
| 4,087,646 A | | 5/1978 | Brolin et al. | |
| 4,373,163 A | | 2/1983 | Vandebult | |
| 4,757,434 A | | 7/1988 | Kawabata et al. | |
| 4,922,261 A | | 5/1990 | O'Farrell | |
| 5,061,941 A | * | 10/1991 | Lizzi et al. | 343/742 |
| 5,198,746 A | | 3/1993 | Gyugyi et al. | |
| 5,339,073 A | | 8/1994 | Dodd et al. | |
| 5,459,451 A | * | 10/1995 | Crossfield et al. | 340/572.7 |
| 5,523,749 A | | 6/1996 | Cole et al. | |
| 5,583,850 A | | 12/1996 | Snodgrass et al. | |
| 5,914,692 A | * | 6/1999 | Bowers et al. | 343/742 |
| 5,946,178 A | | 8/1999 | Bijlenga | |
| 6,166,706 A | * | 12/2000 | Gallagher et al. | 343/742 |
| 6,172,608 B1 | * | 1/2001 | Cole | 340/10.4 |

FOREIGN PATENT DOCUMENTS

| | | |
|---|---|---|
| DE | 37 04 180 | 7/1995 |
| EP | 0 645 840 A1 | 3/1995 |
| EP | 0 693 733 A1 | 1/1996 |
| EP | 0693733 | 1/1996 |
| NL | 9202158 | 7/1994 |
| WO | WO 92/17866 | 10/1992 |
| WO | WO 93/23909 | 11/1993 |
| WO | WO 97/01197 | 1/1997 |
| WO | WO 97/38404 | 10/1997 |
| WO | WO 99/60512 | 11/1999 |
| WO | WO 26989 | 5/2000 |

* cited by examiner

*Primary Examiner*—Brian Zimmerman
*Assistant Examiner*—Clara Yang
(74) *Attorney, Agent, or Firm*—Jenkins, Wilson & Taylor P.A.

(57) ABSTRACT

Methods and systems for compensating magnetic current loops provide current magnitude and phase uniformity within the magnetic current loops. A magnetic current loop is divided into k sections. Each of the k sections has a series reactance. Series reactive compensation is added to each of the k sections such that the reactive compensation substantially cancels the series reactance of each section. Adding reactive compensation to the loop that cancels the series reactance of each section of the loop provides current magnitude and phase uniformity along the loop at any given instant in time. As a result, the magnitude and phase of the magnetic field at a point in space can be controlled with precision to achieve a desired result, such as precise field cancellation or precise field generation.

39 Claims, 7 Drawing Sheets

METHODS AND SYSTEMS FOR REACTIVELY COMPENSATING MAGNETIC CURRENT LOOPS

RELATED APPLICATION INFORMATION

This application claims the benefit of U.S. Provisional Patent Application No. 60/169,726, filed Dec. 8, 1999, the disclosure of which is incorporated herein by reference in its entirety.

TECHNICAL FIELD

The present invention relates to methods and systems for reactively compensating magnetic current loops. More particularly, the present invention relates to methods and systems for adding reactive compensation to magnetic current loops to provide magnitude and phase uniformity along the magnetic current loops.

RELATED ART

Magnetic current loops are commonly used to transfer power and information between microelectronic devices. For example, in one system, a card reader, which includes one or more magnetic current loops, generates a magnetic field by energizing the magnetic current loops. A card, which includes a printed circuit board and one or more magnetic current loops, receives power from the card reader through its magnetic current loops when the card is brought into close proximity to the reader. The card may also receive an information signal from the reader that is modulated on the power signal. The information signal may be a query to which the card responds by transmitting its own information signal to the reader. The reader receives the response from the card and an action takes place, such as the opening of a gate, the storing of identification information, etc.

Systems in which a microelectronic circuit receives power from a magnetic field can be used in warehouses so that a pallet of goods having an inductively-powered identification circuit need only be brought within the communication range of a reader in order to track the location of the goods in the warehouse. Such magnetic-current-loop-based communication systems provide a distinct advantage over conventional systems in which bar codes and bar code readers are used to track goods. Using bar codes and bar code readers to track goods is difficult because a bar code must be brought into very close proximity, e.g., within a few inches, to a bar code reader in order for the information to be read. In addition, bar codes must be read in a specified order and orientation and carry only limited information. Thus, magnetic-current-loop based communication systems provide a significant advantage over conventional bar code systems.

One goal of magnetic-current-loop-based communication systems is to increase the distance at which an electronic circuit can be powered by and communicate with the reader. For instance, in the warehouse example discussed above, it may be desirable for an identification circuit associated with a pallet of goods to be powered by and communicate with a reader at a distance of about 3 meters or more from the reader. One way to increase the communication and powering distance in such a system is to increase the power transmitted by the reader. However, one problem with increasing the power is that regulatory agencies, such as the Federal Communications Commission in the United States, place restrictions on radiated power at given frequencies. These restrictions have prevented conventional systems from achieving the desired communications and powering distance.

In the United States, some Federal Communications Commission limits are based on radiated power at a distance of 30 meters from the source. One frequency range in which the restrictions on radiated power are less stringent than restrictions for other frequency ranges is the range centered at 13.56 MHz. For example, the FCC allows 100 microvolts per meter in the range of 13.56 MHz±7 kHz and only 30 microvolts per meter for frequencies immediately outside of this range. Accordingly, 13.56 MHz is commonly used for magnetic-current-loop-based communication systems. However, even with these decreased restrictions, it has been difficult to design a system that extends the magnetic field to the desired distance without violating regulatory standards.

Exemplary systems capable of achieving the desired goals of increasing the communication and powering distance without violating regulatory standards are described in International Publication No. WO 99/60512, published Nov. 25, 1999, and U.S. Provisional Patent Application No. 60/169,726, filed Dec. 8, 1999, the disclosure of each of which is incorporated herein by reference in its entirety. The systems described in the above-referenced patent applications include multiple magnetic current loops positioned adjacent to each other and separately driven by in-phase current sources. Driving adjacent current loops with in-phase current sources produces a strong near field and a weak far field. As used herein, a near field refers to an electromagnetic field that is located within about 1 wavelength of the source of the electromagnetic field and a far field refers to an electromagnetic field at a distance of more than about 1 wavelength from the source.

A single magnetic dipole produces undesirably high far field radiation. For example, at a distance far from a single magnetic dipole, the dipole appears as a point source. The electric field strength of the single magnetic dipole decreases proportionally to $1/R^2$, where R is the distance from the single magnetic dipole. Because the field strength only decreases at a rate proportional to $1/R^2$, single magnetic dipoles are limited in the amount of transmitter power that can be applied.

The system described in the above-referenced patent applications relies on cancellation of the dipole effects of individual magnetic current loops to produce only quadrupole and higher order fields at distances far from the source. For example, if two identical magnetic current loops are placed adjacent to each other and driven in opposite directions, the dipole fields cancel at a distance far from the source. The remaining far field is a quadrupole field that decreases in strength at a rate of $1/R^3$. Similarly, using four identical, adjacent magnetic current loops driven in the appropriate directions results in cancellation of the dipole and quadrupole fields to produce an octupole field that decreases at a rate of $1/R^4$ in strength as one moves away from the source. Thus, the goal of the system described in the above-referenced patent applications is to produce only higher order fields at distances far from the current loop sources.

One way to achieve magnitude and phase uniformity in magnetic current loop arrays is to divide each magnetic current loop into N sections and to separately drive each of the N sections with its own current source. However, such a system is complex and difficult to implement because it requires synchronization and uniformity among current sources. Accordingly, there exists a long-felt need for methods and systems for providing magnitude and phase uniformity of currents flowing through current loops in a magnetic current loop system.

DISCLOSURE OF THE INVENTION

According to one aspect, the present invention includes methods and systems for providing reactive compensation for magnetic current loops in a magnetic-current-loop-based communication system. For example, each current loop in a magnetic current loop system may be divided into a number of segments. A single current source may be used to drive all of the magnetic current loops in the system. Reactive compensation may be provided for each segment so that the reactive compensation cancels the series reactance of each segment. Because the reactive compensation effectively cancels the reactance of each segment of the current loop, the phase delay along each current loop is nearly zero. As a result, the magnitude and phase of the current along each current loop will be nearly uniform at any given time. In addition, since adjacent loops are preferably divided and reactively compensated in a similar manner, lower-order fields resulting from inexact compensation cancel. Since the dipole fields of such current loops cancel at distances far from the current loops, only quadrupole and higher order fields remain, which decrease rapidly as the distance from the source increases. As a result, near fields can be extended by increasing power without violating regulatory standards and without requiring unnecessarily complex drive electronics. The increased near fields result in a greater communication distance between readers and identification devices. According to another aspect, a magnetic current loop system includes a magnetic current loop being divided into n sections, n being an integer. Each of the n sections has a series reactance at a frequency. n reactive compensation elements are respectively coupled to each of the n sections. Each of the n reactive compensation elements has a reactance that substantially cancels the series reactance of the corresponding section at the frequency. This produces substantial current magnitude and phase uniformity along the magnetic current loop. Each of the n sections includes a series resistance, a series inductance, a shunt capacitance, and a shunt resistance. The shunt capacitance and the shunt resistance each have a first time constant. Each of the reactive compensation elements has a reactance value such that the series reactance and an effective capacitive series reactance of each of the sections has a second time constant that is substantially equal to the first time constant.

Accordingly, it is an object of the present invention to provide methods and systems for reactively compensating magnetic current loops in a manner that allows generation of strong near fields and weak far fields.

It is yet another object of the invention to provide a reader for a magnetic-current-loop-based communication system that includes reactively compensated current loops according to an embodiment of the invention.

Some of the objects of the invention having been stated hereinabove, other objects will be evident as the description proceeds, when taken in connection with the accompanying drawings as best described hereinbelow.

BRIEF DESCRIPTION OF THE DRAWINGS

Preferred embodiments of the present invention will now be explained with reference to the accompanying drawings of which.

DISCLOSURE OF THE INVENTION

Figure 1:
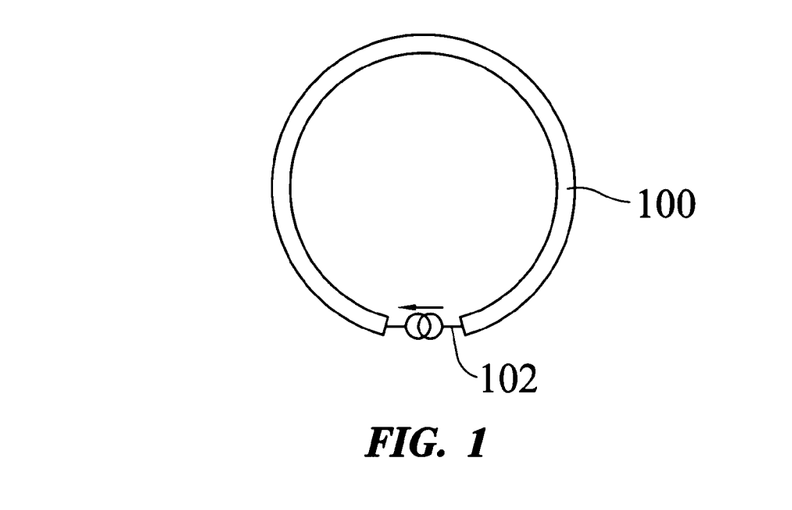
FIG. 1 is a schematic diagram of a magnetic current loop driven by a current source.
Figure 2:
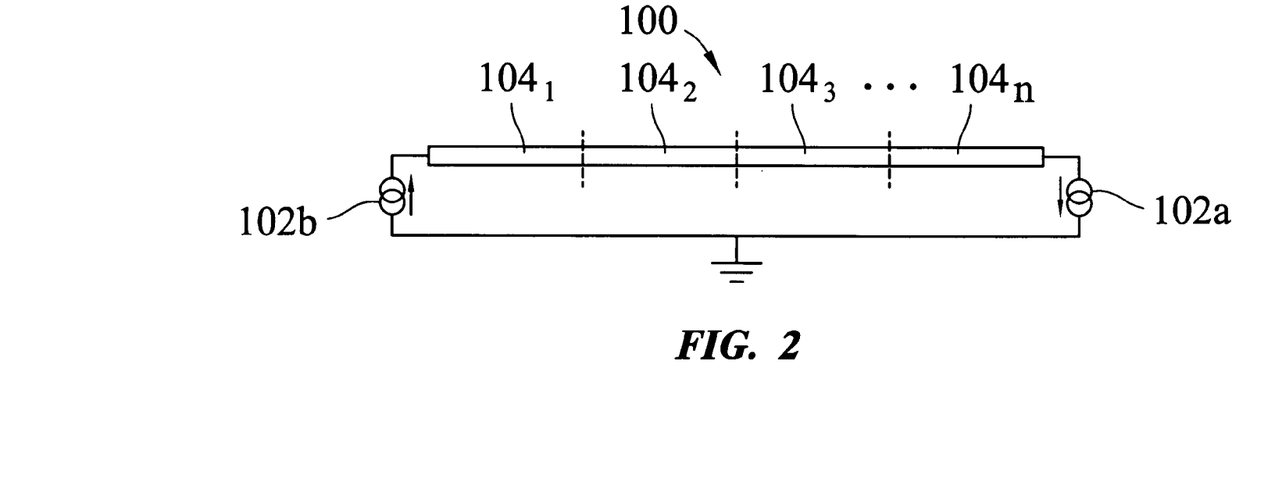
FIG. 2 is a schematic diagram of a transmission line model of the magnetic current loop illustrated in FIG. 1.

FIG. 1 illustrates a magnetic current loop to which reactive compensation according to embodiments of the present invention may be applied. In FIG. 1, magnetic current loop 100 comprises a conductor having a ring or loop configuration. Magnetic current loop 100 is driven by a current source 102. Current source 102, for purposes of the present invention, is a sinusoidal current source. FIG. 2 is a transmission line model illustrating propagation of current around magnetic current loop 100. Propagation of current around a loop conductor driven by a current source can be modeled to a good approximation as a linear transmission line driven at both ends by complementary current sources. In FIG. 2, the complementary current sources are generally indicated by reference numerals 102a and 102b. Magnetic current loop 100 can also be divided into sections $104_1$ through $104_n$ for lumped constant modeling purposes, as will be described in more detail below.

Figure 3:
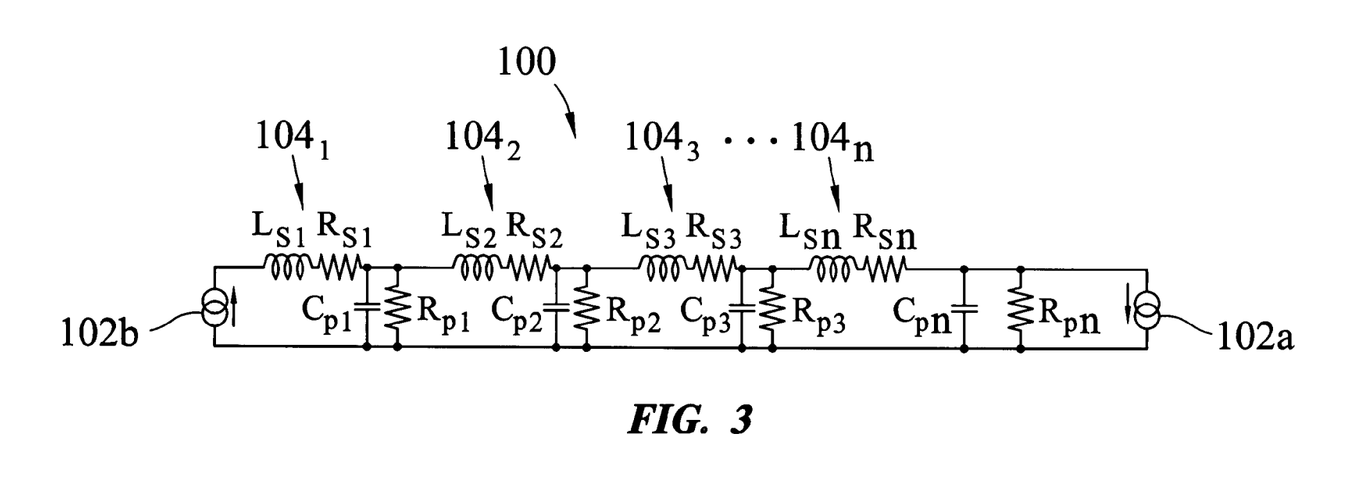
FIG. 3 is a schematic diagram illustrating a ladder network used to model the magnetic current loop of FIG. 1.

FIG. 3 is a ladder network illustrating lumped constant modeling of magnetic current loop 100 illustrated in FIG. 2. For example, a transmission line can be modeled to arbitrary precision by a lumped constant ladder network representing the series connection of arbitrarily short sections of the transmission line. The shorter the sections, the better the approximation. In FIG. 3, each of the sections $104_1$ through $104_n$ includes a series inductance $L_s$, a series resistance $R_s$, a parallel capacitance $C_p$, and a parallel resistance $R_p$. The series inductance $L_s$ represents the series inductance of each section of the conductor. The series resistance $R_s$ represents the resistance of each section. The parallel capacitance $C_p$ represents the shunt capacitance of each section, and the parallel resistance $R_p$ represents the dielectric loss associated with the $C_p$ of each section.

Figure 4:
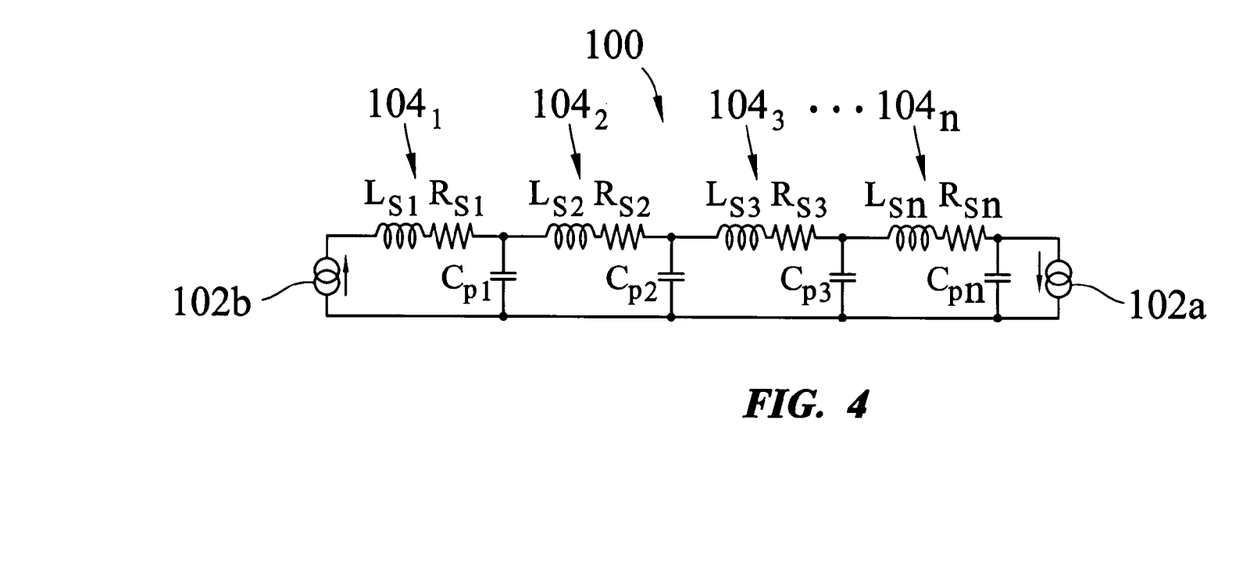
FIG. 4 is a schematic diagram of the ladder network in FIG. 3 in which shunt loss is ignored.

FIG. 4 illustrates a simplified model of magnetic current loop 100 illustrated in FIG. 3. In FIG. 4, the dielectric loss represented by $R_p$ is not included because the dielectric loss of a conductor in air is negligibly small. In embodiments of the invention in which current loop 100 is surrounded by a dielectric other than air, the dielectric loss may require consideration. However, for purposes of explanation, the dielectric loss is omitted. Thus, as illustrated in FIG. 4, each section $104_1$ through $104_n$ includes series inductance and resistance $L_s$ and $R_s$, respectively, and parallel capacitance $C_p$.

Figure 5:
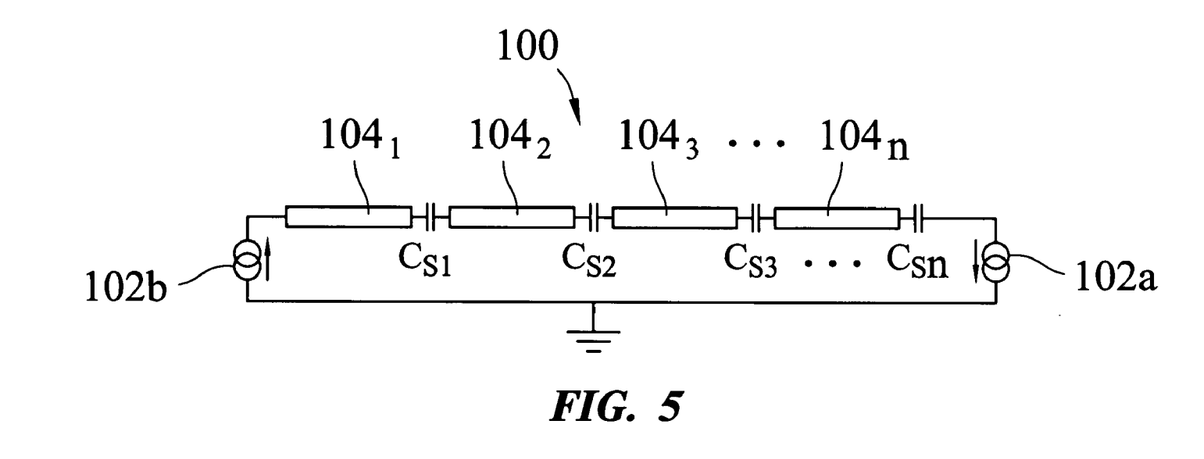
FIG. 5 is a schematic diagram of a magnetic current loop divided into a plurality of sections including reactive compensation for each section according to an embodiment of the present invention.

FIG. 5 illustrates a current loop 100 in which each section $104_1$ through $104_n$ includes reactive compensation according to an embodiment of the present invention. In the illustrated embodiment, the reactive compensation includes n capacitors $C_{s1}$–$C_{sn}$. The capacitance value of each of the capacitors is preferably chosen such that the capacitive reactance of each section cancels the series inductance of each section. For example, the capacitive reactance of $C_{s1}$ of section $104_1$ preferably cancels the inductive reactance caused by the series inductance $L_s$ of section $104_1$. The same is preferably true for the remaining sections of magnetic current loop 100. That is, for each section of magnetic current loop 100, the following expression is preferably true:

$$\omega L_{sn} = \frac{1}{\omega C_{sn}},$$

where $\omega$ is the angular frequency of the current source, $L_{sn}$ is the series inductance of the $n^{th}$ section of magnetic current loop 100, and $C_{sn}$ is the reactive compensation applied according to an embodiment of the present invention.

Figure 6:
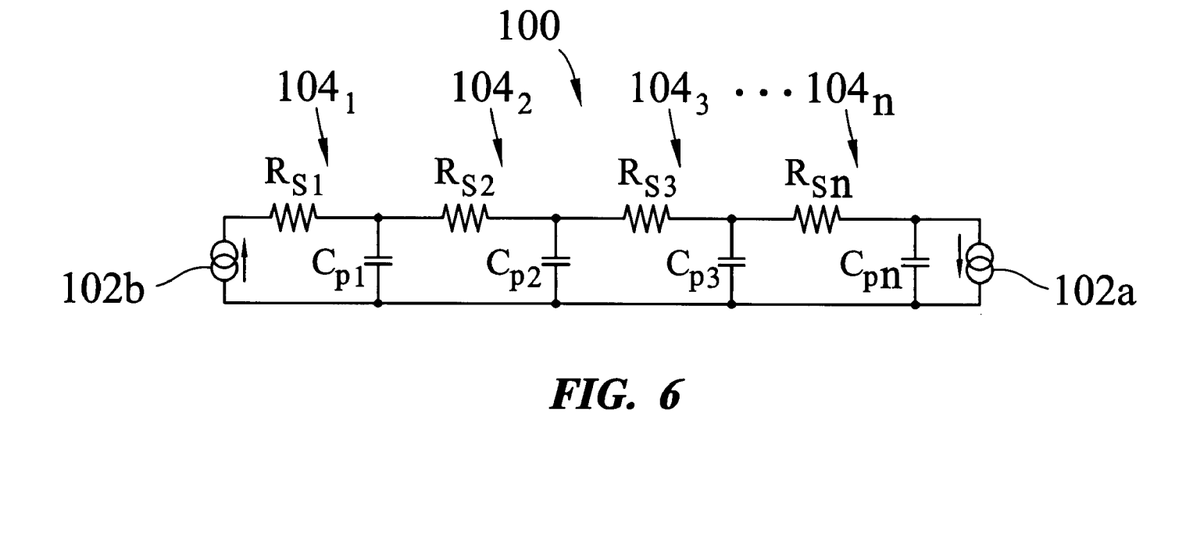
FIG. 6 is a schematic diagram of a ladder network used to model the magnetic current loop of FIG. 5, in which the series reactance is cancelled by the reactive compensation according to an embodiment of the present invention.

Once the series inductance is cancelled, only the series resistance and parallel capacitance of each section remains. FIG. 6 illustrates an example of a circuit model of current loop 100 after application of reactive compensation according to an embodiment of the present invention.

In FIG. 6, each section $104_1$-$104_n$ of magnetic current loop 100 respectively includes series resistance $R_{s1}$-$R_{sn}$ and parallel capacitance $C_{p1}$-$C_{pn}$. The parallel capacitance $C_p$ of each section is sufficiently small that the RC phase delay formed with the parallel capacitance $C_p$ and the series resistance $R_s$ is negligible in all but the most extreme cases. The current drive symmetry of current sources 102a and 102b forms two counter-traveling waves of nearly constant magnitudes. The sum of the counter-traveling waves exhibits nearly perfect phase and magnitude uniformity throughout magnetic current loop 100.

Figure 7A:
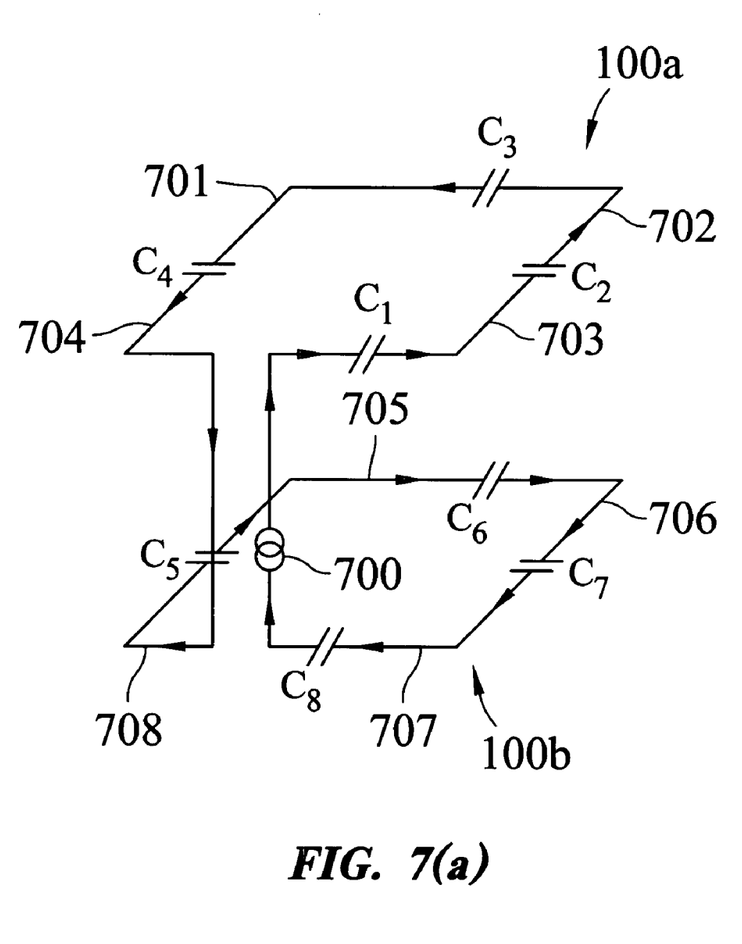
FIG. 7(a) is a perspective view of first and second magnetic current loops including reactive compensation according to an embodiment of the present invention.

FIG. 7(a) is perspective view of two magnetic current loops, each divided into a plurality of sections, wherein each section includes reactive compensation according to an embodiment of the present invention. Referring to FIG. 7(a), magnetic current loops 100a and 100b are driven by sinusoidal current source 700. Current loop 100a is divided into four sections 701–704. Similarly, current loop 100b is divided into four sections 705–708. Each of the current loops 100a and 100b includes reactive compensation to cancel the series reactance of each section. As discussed above, since inductive reactance may be the dominant component of the series reactance of each section, the reactance added to compensate each section may be capacitive in nature. More particularly, in current loop 100a, capacitor $C_1$ is added to cancel the inductive reactance of section 703, capacitor $C_2$ is added to cancel the inductive reactance of section 702, capacitor $C_3$ is added cancel the reactance of section 701, and capacitor $C_4$ is added to cancel the inductive reactance of section 704. Similarly, in current loop 100b, capacitor $C_5$ is added to cancel the inductive reactance of section 708, capacitor $C_6$ is added to cancel the inductive reactance of section 705, capacitor $C_7$ is added to cancel the inductive reactance of section 706, and capacitor $C_8$ is added to cancel the inductive reactance of section 707.

When a current loop is divided into sections and reactively compensated such that the series reactance of each section is effectively cancelled, magnitude and phase of the current at any point on the current loop is nearly equal at any given instant and time. As a result, the magnitude and phase on adjacent current loops that are properly reactively compensated is also nearly equal. Moreover, since the current flows in one direction in one magnetic current loop and in the opposite direction in the other magnetic current loop, the dipole magnetic fields of the two current loops cancel. As a result, the only far field that remains is the quadrupole field. Since the quadrupole field decreases proportionally to $$\frac{1}{R^3},$$

where R is the distance from the source, it is possible to increase the power, thereby increasing the near fields without producing a corresponding strong far field that exceeds the appropriate regulatory agencies limit for electromagnetic radiation. Such a configuration is especially well adapted for radio frequency identification devices, as will be discussed in more detail below.

Although the embodiment illustrated in FIG. 7(a) includes only two magnetic current loops, the present invention is not limited to such an embodiment. A magnetic current loop system may include any number of magnetic current loops. Suitable magnetic current loop systems to which reactive compensation according to the present invention may be added are described in detail in the above-referenced copending patent applications. Hence, a description thereof will not be repeated herein.

Figure 7B:
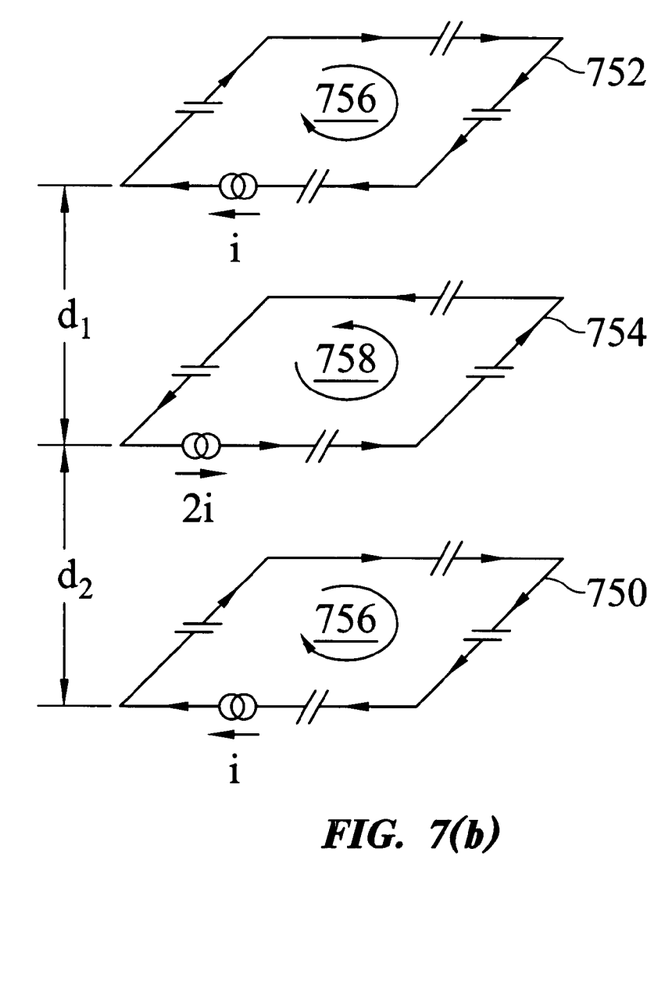
FIG. 7(b) is a perspective view of first, second, and third magnetic current loops having reactive compensation according to an embodiment of the present invention.

FIG. 7(b) is a perspective view of a magnetic current loop system according to an alternative embodiment of the present invention. In FIG. 7(b) a magnetic current loop system includes first and second magnetic loops 750 and 752 and a third magnetic current loop 754. Each of the magnetic current loops 750, 752, and 754 includes reactive compensation on a per section basis as previously described. In addition, the outer magnetic current loops 750 and 752 are driven by a current source such that current flows in a first direction 756. The inner magnetic current loop 754 is driven by a current source such that current flows in a second direction 758 that is opposite the first direction 756. In addition, the current flowing through inner magnetic current loop 754 is preferably twice that of the identical currents flowing through outer magnetic current loops 750 and 752. In addition, inner magnetic current loop 754 is preferably equally spaced from outer magnetic current loops 750 and 752. In other words, the distances $d_1$ and $d_2$ in FIG. 7(b) are preferably equal.

Given the configuration illustrated in FIG. 7(b), the dipole and quadrupole fields produced by the magnetic current loops cancel at distances far from the magnetic current loops, i.e., more than 1 wavelength from the magnetic current loop. As a result, only the octupole field remains, which decreases at a rate proportional to $1/R^4$. The system illustrated in FIG. 7(b) is not limited to three magnetic current loops. For example, in an alternative embodiment, inner magnetic current loop 754 can be replaced by two magnetic current loops spaced closely to each other. In such an embodiment, the current flowing through each of the two magnetic current loops would flow in the direction 758 illustrated in FIG. 7(b) and the current through each of the magnetic current loops would be i, rather than 2i. In this alternative embodiment, dipole and quadrupole cancellation would still be achieved.

Figure 8:
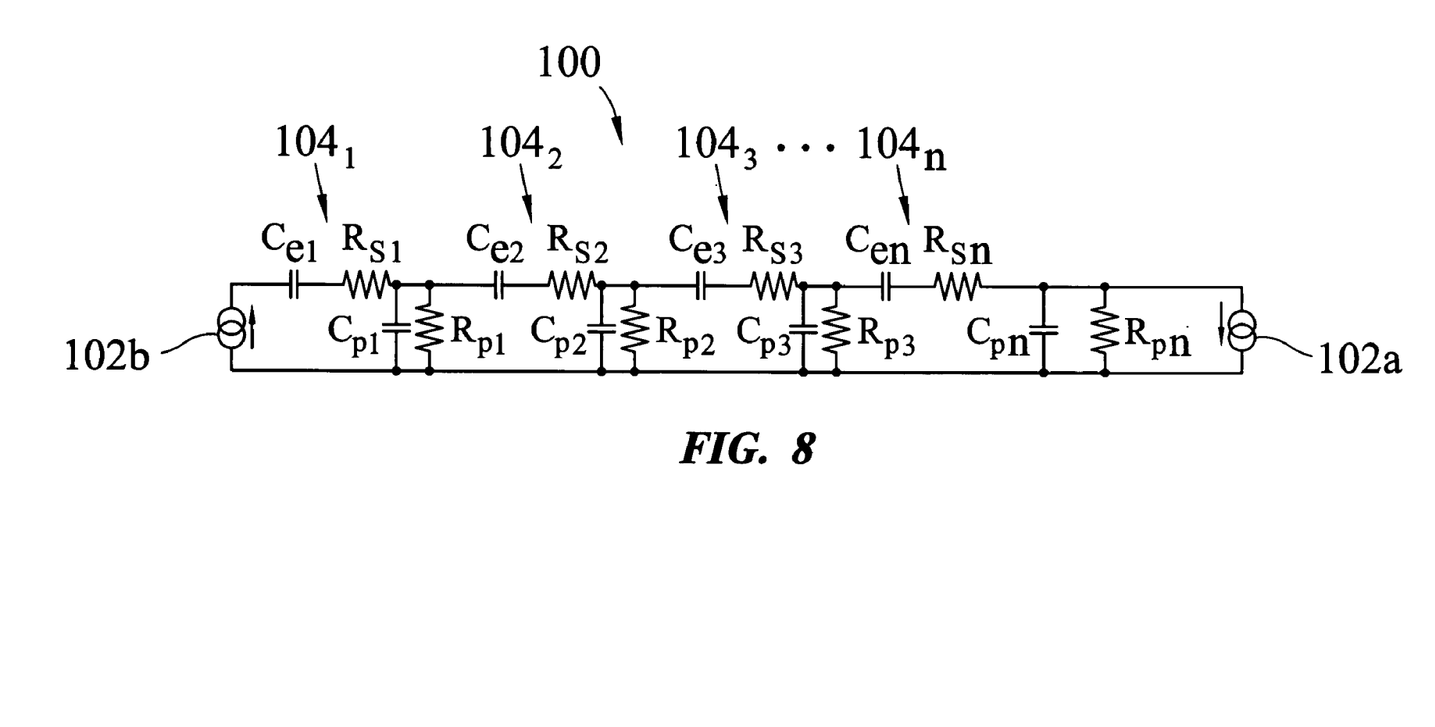
FIG. 8 is a schematic diagram illustrating a circuit model of a magnetic current loop in which capacitive reactance is chosen slightly off resonance according to an alternative embodiment of the present invention.

FIG. 8 is a schematic diagram of a magnetic current loop including reactive compensation according to an embodiment of the present invention in which the compensating reactance is chosen to be slightly off resonance for each section. More particularly, each capacitor $C_{s(k)}$ where $1 \leq k \leq n$ is chosen to be slightly off resonance for its respective section (k), such that the series impedance of the compensated section is $$Z_{s(k)} = R_{s(k)} - \frac{j}{\omega C_{e(k)}},$$

where $$C_{e(k)} = \frac{C_{s(k)}}{1 - \omega^2 L_{s(k)} C_{s(k)}}$$

is the effective series capacitance of section (k). The value of $C_{e(k)}$ must be chosen such that $Z_{s(k)}$ of section (k) is a positive real constant $A_{(k)}$ times the parallel impedance $Z_{p(k)} = X_{(k)} Z_p$ real number $X_{(k)}$ is the effective length of section (k), $$Z_p = \frac{R_p}{1 + j\omega R_p C_p}$$

is the shunt impedance of a unit length section, and $R_p$ and $C_p$ are parallel resistance and capacitance respectively per unit length of section. Notice that except for $X_{(k)}$, $Z_{p(k)}$ depends only on the dielectric environment of the section. Therefore, the $Z_{p(k)}$ of all sections of a loop are real valued multiples $X_{(k)}$ of the same complex constant if the loop is in a uniform dielectric environment, such as identical width runs on a printed circuit board. If input impedance $Z_{in(k+1)}$ of section (k+1) is $D_{(k+1)} Z_p$, then input impedance $Z_{in(k)}$ of section (k) is $$Z_{in(k)} = Z_{s(k)} + \frac{Z_{p(k)} Z_{in(k+1)}}{Z_{p(k)} + Z_{in(k+1)}} = \left( X_{(k)} A_{(k)} + \frac{X_{(k)} D_{(k+1)}}{X_{(k)} + D_{(k+1)}} \right) Z_p = D_{(k)} Z_p,$$

where $D_{(k)}$ is a real number. By recursion then, $Z_{in(k)} = D_{(k)} Z_p$ where $D_{(k)}$ is real for all (k). The current transfer function for section (k) is:

$$F(k) = \frac{Z_p(k)}{Z_{in}(k+1) + Z_p(k)} = \frac{X(k)}{D(k+1) + X(k)}$$

which is real, and which means theoretically that the input and output currents are exactly in phase. Consequently, the phase uniformity of the entire loop may be made arbitrarily good with suitably large choice of n.

Magnetic-Current-Loop-Based Communication Systems

Figure 9:
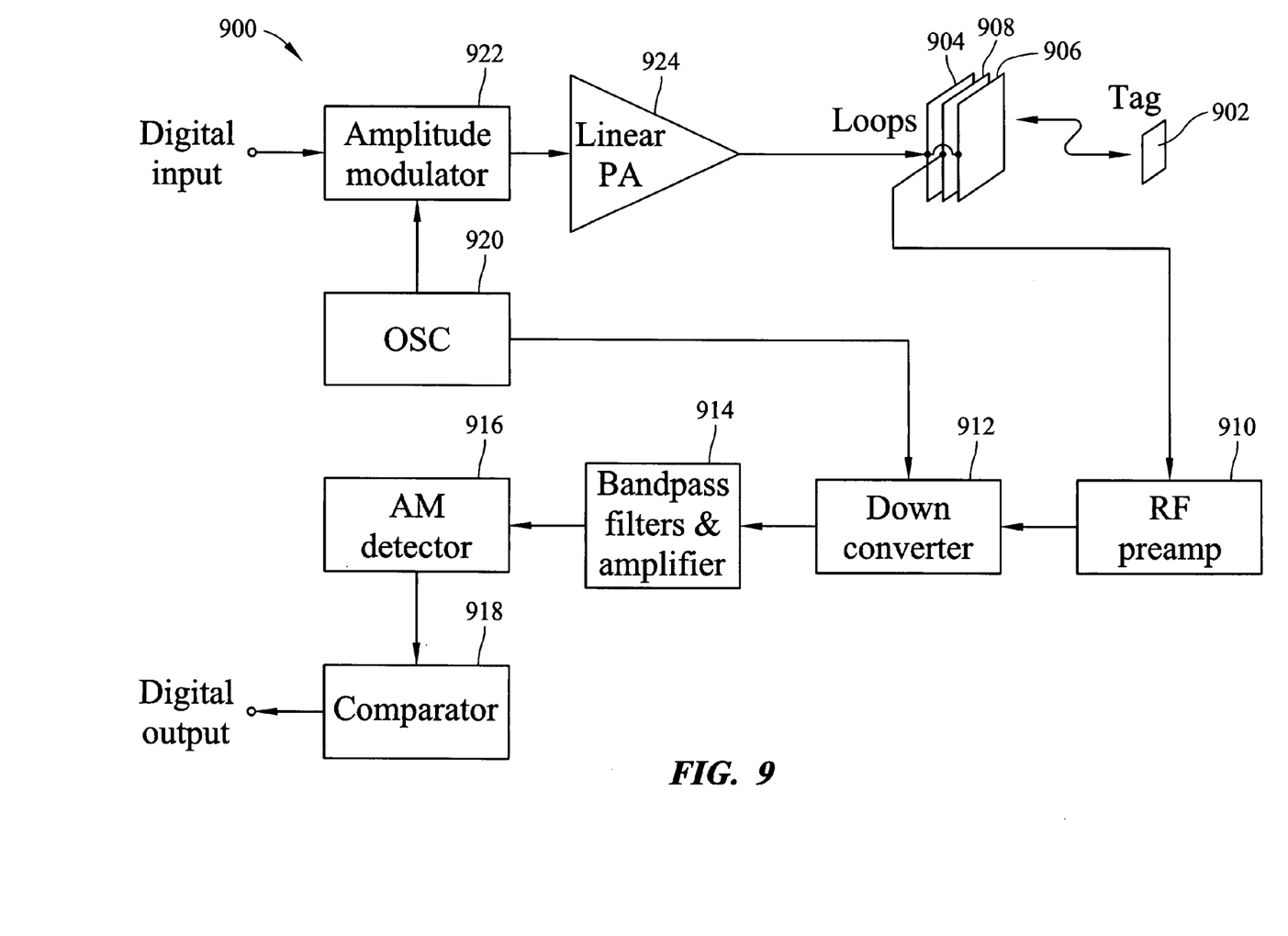
FIG. 9 is a schematic diagram of a reader including reactively compensated magnetic current loops according to an embodiment of the present invention.

FIG. 9 is a block diagram of a radio frequency identification tag reader 900 and a radio frequency identification tag 902 wherein the reader includes magnetic current loops having reactive compensation according to an embodiment of the present invention. In the illustrated embodiment, reader 900 includes driven magnetic current loops 904 and 906. Magnetic current loops 904 and 906 are adapted to couple a radio frequency magnetic field to identification tag 902. Magnetic current loop 908 is adapted to detect a radio frequency magnetic field produced by identification tag 902. Detecting magnetic current loop 908 is preferably located between driven magnetic current loops 904 and 906 and spaced equidistantly from magnetic current loops 904 and 906. Magnetic current loops 904 and 906 produce opposing magnetic fields such that the dipole fields cancel. Because magnetic current loops 904 and 906 produce opposing magnetic fields, the magnetic field between magnetic current loops 904 and 906 cancels at a distance that is equidistant from magnetic current loops 904 and 906. Accordingly, locating detecting magnetic current loop 908 equidistant between driven magnetic current loops 904 and 906 minimizes the detection of the signal produced by magnetic current loops 904 and 906 by magnetic current loop 908.

Reader 900 includes circuitry for processing the field detected from identification tag 902 into usable format. In the illustrated embodiment, the circuitry includes a radio frequency preamplifier 910 for preamplifying the detected field, a down converter 912 for converting the detected field to a signal at a convenient frequency, bandpass filters and amplifier 914 for amplifying and filtering the signal in a band centered at the frequency of the output from down converter 912, amplitude modulation detector 916 for detecting the amplitude of the signal, and comparator 918 for converting the signal into digital format. RF preamp 910 may be any conventional amplifier circuit that amplifies signals at the frequencies of interest. Down converter 912 may be a conventional mixer that subtracts the frequency of a reference signal produced by an oscillator 920 from the frequency of the detected field. Oscillator 920 may be any type of conventional resonator adapted to produce a signal at a frequency corresponding to the card communication frequency, which may be 13.56 MHz. Bandpass filters and amplifier 914 may include a conventional bandpass filter and an amplifier adapted to amplify the signal about the frequency produced by down converter 912. Amplitude modulation detector 916 may be a conventional rectifier circuit that detects the amplitude of a signal. Finally, comparator 918 may be a conventional comparator integrated circuit that produces a digital output based on the relationship between an analog input and a reference value.

On the driving side, reader 900 includes an amplitude modulator 922 and a linear power amplifier 924. Amplitude modulator 922 may be any type of conventional amplitude modulator. Power amplifier 924 may be any conventional amplifier with a gain that is adjusted to produce a magnetic field in a range sufficient to communicate with tag 902 at a distance of at least about 3 meters from current loops 904, 906, and 908.

In operation, reader 900 preferably continuously produces a magnetic field that will power a tag when the tag is brought within a predetermined distance of transmitting current loops 904 and 906. When a tag, such as tag 902, is brought into the range of magnetic current loops 904 and 906, tag 902 rectifies the signal and utilizes the rectified signal to power a microprocessor resident on tag 902. The microprocessor resident on tag 902 amplitude modulates a digital signal on a subcarrier which in turn varies the resonant frequency of its current loop to produce an amplitude modulation of the circulating current. Detecting loop 908 of reader 900 detects the amplitude modulated field from tag 902. RF preamp 910 amplifies the detected field from tag 902. Down converter 912 converts the amplified signal to the subcarrier frequency. Bandpass filters and amplifier 914 filter unwanted components from the signal and amplify the components of interest. AM detector 916 detects the amplitude of the received signal. Finally, comparator 918 converts the signal from the tag into digital format. The digital output from comparator 918 may be processed by a microprocessor resident in reader 900 to perform some useful functions. For example, if tag 902 is located on a product in a manufacturing facility, the information received from the tag may be an identification code or serial number for the product and the microprocessor of reader 900 may store the serial number in memory. Another example of information that may be produced by tag 902 is an access code to access a secure facility. In this instance, the microprocessor of reader 900 may grant or deny access.

Because magnetic current loops 904 and 906 include reactive compensation according to embodiments of the present invention, tag 902 can be read at a distance that is spaced from magnetic loops 904 and 906 without requiring a power increase at reader 900 that violates regulatory limits. In addition, because the individual sections of magnetic current loops 904 and 906 do not require separate power sources, the circuitry used to drive magnetic current loops 904 and 906 is simplified.

Although the multi-loop systems described above focus primarily on flowing currents in opposite directions in adjacent magnetic current loops, the present invention is not limited to such an embodiment. For example, in metrology, it may be desirable to drive Helmholtz coils at a high frequency. Helmholtz coils are of a particular geometry of two circular loops which at DC produce a region about their center where the field and its first spatial derivative are constant which may also be useful to accomplish in the RF band. The currents in the loops preferably flow in the same direction. Helmholtz coils are often used to cancel the DC magnetic field produced by the earth or other source within some defined volume. High frequency Helmholtz coils may be similarly used to cancel out interfering magnetic fields at a high frequency. Alternatively, it may be desirable to create a high frequency magnetic field having a uniform magnitude within a defined volume.

Accordingly, reactive compensation may be added to current loop(s) and the current loops may be driven by currents flowing in the same direction to achieve magnetic field cancellation of an externally generated high frequency field, or production of a uniform high frequency magnetic field within a defined volume. Externally generated high frequency magnetic field cancellation may be useful in a laboratory in which it is desirable to have a zero-magnetic field. In this situation, the axes of the Helmholtz coils would be oriented parallel to the magnetic field to be cancelled, and driven by currents flowing in the same direction in order to achieve the cancellation.

It will be understood that various details of the invention may be changed without departing from the scope of the invention. Furthermore, the foregoing description is for the purpose of illustration only, and not for the purpose of limitation—the invention being defined by the claims.

What is claimed is:

1. A magnetic current loop system adapted to produce strong near fields and weak far fields, the magnetic current loop system comprising:
   (a) first and second magnetic current loops for generating a local magnetic field, the magnetic current loops being divided into k sections, k being an integer, each of the k sections having a series reactance at a frequency;
   (b) k reactive compensation elements for controlling generation of the local magnetic field, each reactive compensation element being coupled to one of the k sections and having a reactance that substantially cancels the series reactance of each section at the frequency; and
   (c) a current source coupled to the first and second magnetic current loops such that current flows in a first direction in the first magnetic current loop and in a second direction, opposite the first direction, in the second magnetic current loop, the current producing a strong magnetic field near the first and second magnetic current loops and substantially canceling dipole magnetic fields produced by the magnetic current first and second loops at a distance far from the first and second magnetic current loops, the reactive compensation elements producing substantial uniformity in phase and magnitude of the current flowing through each loop and thereby enabling the cancellation of the dipole magnetic fields.

2. The magnetic current loop system of claim 1 wherein the series reactance of each of the k sections comprises an inductive reactance and each of the k reactive compensation elements comprises a capacitor.

3. The magnetic current loop system of claim 1 wherein the k sections are substantially equal in length and the series reactances of the k sections are substantially equal.

4. The magnetic current loop system of claim 1 wherein at least some of the k sections are unequal in length and some of the series reactances of the k sections are not equal.

5. The magnetic current loop system of claim 1 wherein the current source is adapted to produce a current having a frequency of about 13.56 MHz.

6. The magnetic current loop system of claim 1 wherein the first magnetic current loop is located in a first plane and the second magnetic current loop is located in a second plane spaced from and parallel to the first plane.

7. The magnetic current loop system of claim 1 wherein each of the first and second magnetic current loops includes n turns, n being an integer.

8. The magnetic current loop system of claim 7 wherein n is equal to one.

9. The magnetic current loop system of claim 7 wherein n is greater than one.

10. The magnetic current loop system of claim 1 wherein the first and second magnetic current loops are coaxial with each other.

11. The magnetic current loop system of claim 10 wherein sections of the first magnetic current loop are substantially equal in length to adjacent sections of the second magnetic current loop.

12. The magnetic current loop system of claim 11 wherein the reactive compensation elements associated with sections of the first magnetic current loop are substantially equal in reactance to reactive compensation elements of the adjacent sections of the second magnetic current loop.

13. The magnetic current loop system of claim 1 wherein the first and second magnetic current loops are located in different planes.

14. A magnetic current loop system adapted to produce strong near fields and weak far fields, the magnetic current loop system comprising:
  (a) first and second magnetic current loops for generating a local magnetic field, the magnetic current loops being divided into k sections, k being an integer, each of the k sections having a series reactance at a frequency;
  (b) k reactive compensation elements for controlling generation of the local magnetic field, each reactive compensation element being coupled to one of the k sections and having a reactance that substantially cancels the series reactance of each section at the frequency; and
  (c) a current source coupled to the first and second magnetic current loops such that current flows in a first direction in the first magnetic current loop and in a second direction, opposite the first direction, in the second magnetic current loop thereby substantially canceling a dipole field at a distance spaced from the first and second magnetic current loops, wherein the series reactance of each of the k sections comprises an inductive reactance and each of the k reactive compensation elements comprises a capacitor, and wherein each capacitor has a capacitance value $C_k$ such that $$\frac{1}{\omega C_k} = \omega L_k,$$

wherein $\omega$ the angular frequency of the current source and $L_k$ is the series inductance of the $k^{th}$ section of the magnetic current loops.

15. A reader for a magnetic-current-loop-based communication system, the reader comprising:
  (a) first and second magnetic current loops for generating a local magnetic field, each being divided into n sections, n being an integer, each section having a series reactance, the first and second magnetic current loops having a total of 2n sections;
  (b) 2n reactive compensation elements for controlling generation of the local magnetic field, one element being associated with each of the 2n sections, such that the reactive compensation elements substantially cancel the series reactance of each of the sections; and
  (c) circuitry operatively associated with the first and second magnetic current loops for communicating with a device when the device is within a predetermined distance of the first and second magnetic current loops, wherein the circuitry includes a current source for driving the first and second magnetic current loops to produce a strong magnetic field near the first and second magnetic current loops and to substantially cancel dipole magnetic fields produced by the first and second magnetic current loops at distances far from the first and second magnetic current loops, the reactive compensation elements producing substantial uniformity in phase and magnitude of the current flowing through each loop and thereby enabling the cancellation of the dipole magnetic fields.

16. The reader of claim 15 wherein the first and second magnetic current loops are coaxial with each other.

17. The reader of claim 16 wherein the first and second magnetic current loops are connected to each other so that current flows in a first direction through the first magnetic current loop and in a second direction, opposite the first direction, through the second magnetic current loop.

18. A reader for a magnetic-current-loop-based communication system, the reader comprising:
  (a) first and second magnetic current loops for generating a local magnetic field, each being divided into n sections, n being an integer, each section having a series reactance;
  (b) 2n reactive compensation elements for controlling generation of the local magnetic field, one element being associated with each of the 2n sections, such that the reactive compensation elements substantially cancel the series reactance of each of the sections:
  (c) circuitry operatively associated with the first and second magnetic current loops for communicating with a device when the device is within a predetermined distance of the first and second magnetic current loops, wherein the first and second magnetic current loops are coaxial with each other;
  (d) a third magnetic current loop positioned between and equidistant from the first and second magnetic current loops for coupling to a magnetic field from the device; and
  (e) circuitry operatively associated with the third magnetic current loop for processing a signal modulated on the magnetic field from the device.

19. The reader of claim 18 comprising a microprocessor operatively associated with the circuitry for performing a predetermined function in response to the signal from the device.

20. The reader of claim 19 wherein the microprocessor is adapted to perform an authentication function in response to the signal from the device.

21. The reader of claim 19 wherein the microprocessor is adapted to store at least some of the information contained in the signal from the device in a memory device.

22. A magnetic current loop system comprising:
  (a) a plurality of magnetic current loops for generating a local magnetic field, each magnetic current loop being divided into n sections, n being an integer, each of the n sections having a series reactance at a frequency;
  (b) n reactive compensation elements for controlling generation of the local magnetic field, the reactive compensation elements being respectively coupled to each of the n sections of each loop, each of the n reactive compensation elements having a reactance that substantially cancels the series reactance of the corresponding section at the frequency, thereby producing substantial current magnitude and phase uniformity along the magnetic current loop; and
  (c) a current source coupled to the magnetic current loops for producing a current in the magnetic current loops, wherein the magnetic current loops are coupled to each other such that a strong magnetic field is produced near the magnetic current loops and such that dipole magnetic fields resulting from the current flowing through each loop cancel at distances far from the current loops, the reactive compensation elements producing substantial uniformity in phase and magnitude of the current flowing through each loop and thereby enabling the cancellation of the dipole magnetic fields.

23. The system of claim 22 wherein the series reactance of each of the n sections comprises an inductive reactance and the reactance of each of the respective compensation elements comprises a capacitive reactance.

24. The system of claim 22 wherein each of the n sections includes a series resistance, a series inductance, a shunt capacitance, and a shunt resistance, the shunt capacitance and the shunt resistance of each section having a first time constant, and wherein each of the reactive compensation elements has a reactance value such that the series resistance and an effective capacitive series reactance of each of the sections has a second time constant that is substantially equal to the first time constant.

25. A magnetic current loop system comprising:
(a) n magnetic current loops for generating a local magnetic field, n being an integer, each of the n magnetic current loops being divided into sections, each section having a series reactance, the magnetic current loops being coupled to each other and magnetized in opposite directions to produce a strong magnetic field near the magnetic current loops and to substantially cancel a dipole magnetic field at distances far from the magnetic current loops, the reactive compensation elements producing substantial uniformity in phase and magnitude of the current flowing through each loop and enabling the cancellation of the dipole magnetic fields; and
(b) reactive compensation elements respectively coupled to the sections for controlling generation of the local magnetic field, each of the reactive compensation elements having a reactance that substantially cancels the series reactance of the respective section.

26. The system of claim 25 wherein n is equal to one.

27. The system of claim 25 wherein n is greater than one.

28. The system of claim 27 comprising a current source coupled to each of the magnetic current loops such that current flows in the same direction in all of the magnetic current loops.

29. The system of claim 25 wherein the n magnetic current loops comprise first, second, and third magnetic current loops being coaxial with each other, the third magnetic current loop being located between the first and second magnetic current loops.

30. The system of claim 25 wherein the n magnetic current loops comprise first and second pairs of magnetic current loops being coaxial with each other.

31. The system of claim 30 wherein the first and second pairs of magnetic current loops each include an inner magnetic current loop and an outer magnetic current loop, and the inner magnetic current loops of each pair are adjacent to each other.

32. The system of claim 31 comprising a current source coupled to the outer magnetic current loop of each pair such that current flows in a first direction in the outer magnetic current loop of each pair and to the inner magnetic current loop of each pair such that the current flows in a second direction opposite the first direction in the inner magnetic current loop of each pair.

33. A magnetic current loop system comprising:
(a) n magnetic current loops for generating a local magnetic field, n being an integer, each of the n magnetic current loops being divided into sections, each section having a series reactance, wherein the n magnetic current loops comprise first, second, and third magnetic current loops being coaxial with each other, the third magnetic current loop being located between the first and second magnetic current loops;
(b) reactive compensation elements respectively coupled to the sections for controlling generation of the local magnetic field, each of the reactive compensation elements having a reactance that substantially cancels the series reactance of the respective section; and
(c) a first current source coupled to the first and second magnetic current loops adapted to produce a first current having a first magnitude and a first direction in the first and second magnetic current loops and a second current source coupled to the third magnetic current loop adapted to produce a second current having a second magnitude and a second direction in the third magnetic current loop, the second direction being opposite the first direction and the second magnitude being twice the first magnitude.

34. A method for reactively compensating magnetic current loops, the method comprising:
(a) dividing first and second magnetic current loops into k sections, k being an integer, each of the k sections having a series reactance at a frequency;
(b) adding reactive compensation to each of the k sections such that the reactive compensation substantially cancels the series reactance of each of the k sections and controls generation of a local magnetic field by the magnetic current loops;
(c) driving the magnetic current loops with a current source having a frequency such that current flows in a first direction in the first magnetic current loop and in a second direction in the second magnetic current loop and producing a strong magnetic field near the magnetic current loops; and
(d) placing the first and second magnetic current loops in close proximity to each other to substantially cancel dipole magnetic fields produced by the magnetic current loops at distances far from the magnetic current loops, the reactive compensation elements producing substantial uniformity in phase and magnitude of the current flowing through each loop and thereby enabling the cancellation of the dipole magnetic fields.

35. The method of claim 34 wherein the series reactance of each of the k sections is a series inductive reactance and adding reactive compensation to each of the k sections includes adding a capacitor to each of the k sections.

36. The method of claim 34 wherein dividing the first and second magnetic current loops into k sections includes dividing the first and second magnetic current loops into k sections having substantially equal lengths such that the series reactances of the k sections are substantially equal.

37. The method of claim 34 wherein dividing the first and second magnetic current loops into k sections includes dividing the first and second magnetic current loops into k sections, at least some of which are unequal in length, such that the series reactances of at least some of the k sections are not equal.

38. The method of claim 34 wherein driving the magnetic current loops with the current source comprises driving the magnetic current loops with the current source having the frequency substantially centered about 13.56 MHz.

39. A method for reactively compensating a magnetic current loop, the method comprising:
(a) dividing each of first and second magnetic current loops into k sections, k being an integer, each of the k sections having a series reactance at a frequency;
(b) adding reactive compensation to each of the k sections such that the reactive compensation substantially cancels the series reactance of each of the k sections at the frequency, thereby making the amplitude and phase of a current in the loop at the frequency substantially uniform throughout the loop and thereby providing more precise control over generation of a magnetic field at the frequency; and (c) coupling the magnetic current loops to each other and driving the magnetic current loops to produce a strong magnetic field near the magnetic current loops and to substantially cancel dipole magnetic fields produced by the magnetic current loops at distances far from the magnetic current loops, the reactive compensation elements producing substantial uniformity in phase and magnitude of the current flowing through each loop and thereby enabling the cancellation of the dipole magnetic fields.

* * * * *

UNITED STATES PATENT AND TRADEMARK OFFICE
CERTIFICATE OF CORRECTION

| | | |
|---|---|---|
| PATENT NO. | : 6,960,984 B1 | Page 1 of 1 |
| APPLICATION NO. | : 09/723356 | |
| DATED | : November 1, 2005 | |
| INVENTOR(S) | : Vicci et al. | |

It is certified that error appears in the above-identified patent and that said Letters Patent is hereby corrected as shown below:

Col. 1, line 10

Insert the paragraph:

-- GOVERNMENT SUPPORT

This invention was made with government support under Grant No. EB002025 awarded by the National Institutes of Health. The government has certain rights in the invention. --

Signed and Sealed this

Twenty-seventh Day of November, 2012

David J. Kappos
*Director of the United States Patent and Trademark Office*